No. 799,755. PATENTED SEPT. 19, 1905.
E. F. POWELL & T. B. GRAY.
GRAIN CRIB.
APPLICATION FILED NOV. 1, 1904.
2 SHEETS—SHEET 1.
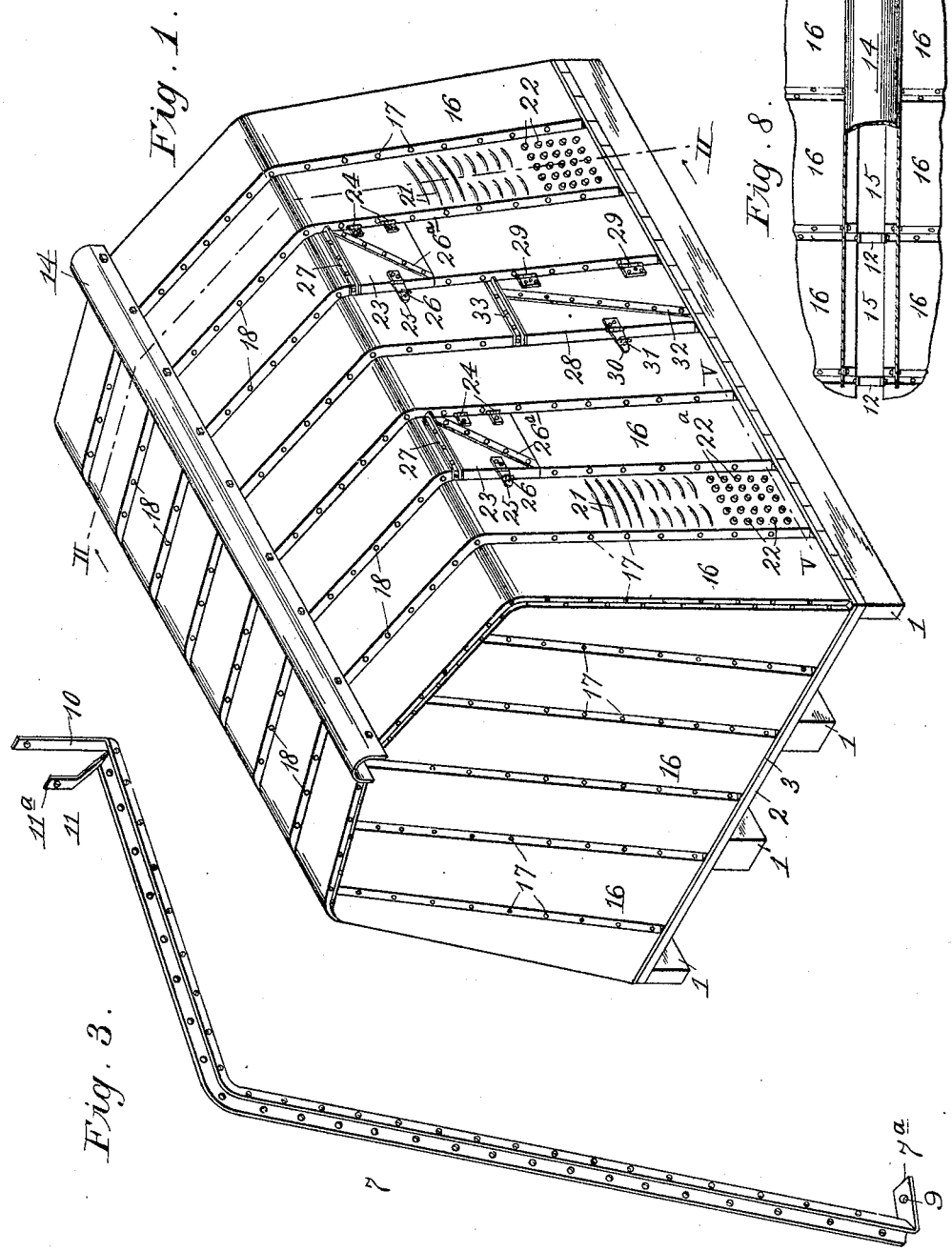
WITNESSES:
R. E. Hamilton
J. Moore
INVENTORS:
Eugene F. Powell
and Thomas Bush Gray
By F. G. Fischer, Atty.

No. 799,755. PATENTED SEPT. 19, 1905.
E. F. POWELL & T. B. GRAY.
GRAIN CRIB.
APPLICATION FILED NOV. 1, 1904.
2 SHEETS—SHEET 2.
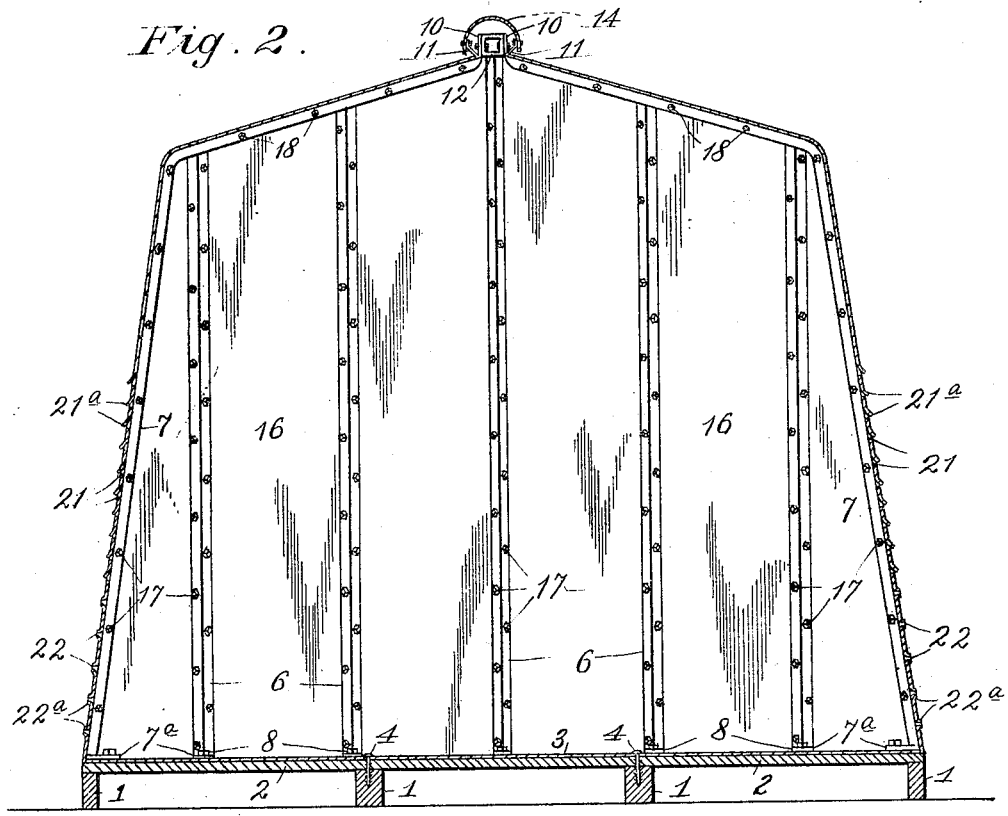
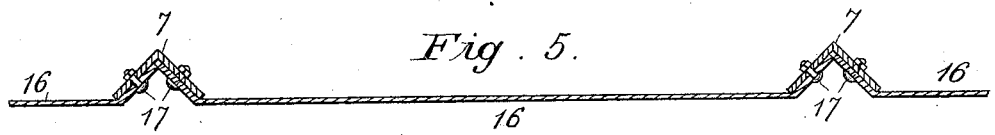
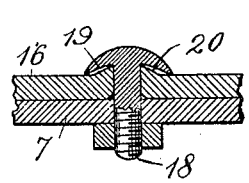
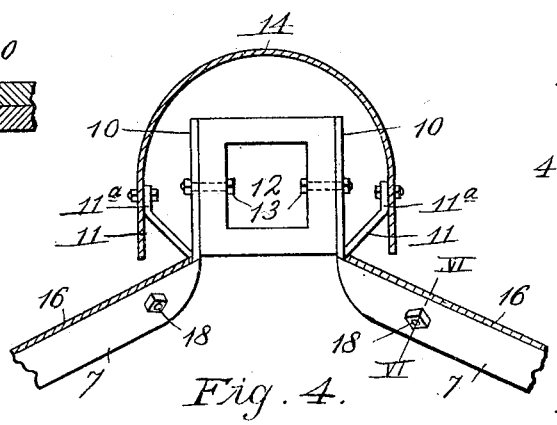
WITNESSES:
R. E. Hamilton
J. Moore
INVENTORS:
Eugene F. Powell
and Thomas Bush Gray
By F. G. Fischer Atty.

UNITED STATES PATENT OFFICE.

EUGENE F. POWELL, OF EVEREST, AND THOMAS BUSH GRAY, OF TOPEKA, KANSAS.

GRAIN-CRIB.

No. 799,755.　　　Specification of Letters Patent.　　　Patented Sept. 19, 1905.

Application filed November 1, 1904. Serial No. 231,031.

*To all whom it may concern:*

Be it known that we, EUGENE F. POWELL, residing at Everest, in the county of Brown, and THOMAS BUSH GRAY, residing at Topeka, in the county of Shawnee, State of Kansas, citizens of the United States, have invented certain new and useful Improvements in Grain-Cribs, of which the following is a specification.

Our invention relates to improvements in grain-cribs; and one of our objects is to provide a crib which can be shipped in a knocked-down condition and readily set up for use without the assistance of skilled mechanics.

Another object is to provide a crib which shall be fireproof, rodent-proof, and waterproof when set up for use.

A further object is to provide a thoroughly-ventilated crib in order to prevent the grain stored therein from sweating or becoming moldy.

Other objects of the invention will be hereinafter set forth, and in order that said invention may be fully understood reference will now be made to the accompanying drawings, in which—

Figure 1 represents a perspective view of our improved grain-crib set up ready for use. Fig. 2 is a vertical transverse section of the same, taken on line II II of Fig. 1. Fig. 3 is a detail perspective view of one of the combination studs and rafters forming the framework of the crib. Fig. 4 is an enlarged detail transverse section of the top of the crib, showing the ventilator at this point. Fig. 5 is an enlarged longitudinal section, taken on line V V of Fig. 1, showing the manner in which the sheet-metal sheathing is secured to the combined studding and rafters. Fig. 6 is a transverse section, taken on line VI VI of Fig. 4, showing the manner in which the sheathing forming the roof of the crib is bolted to the frame of the latter. Fig. 7 is a detail elevation of one of the nails employed in securing the sheet-metal covering to the flooring of the crib. Fig. 8 is a broken plan view showing one of the ventilating-openings in the top of the crib.

In said drawings, 1 designates the sills of the crib, 2 a wooden flooring laid upon said sills, and 3 the sheet-metal covering, which is secured upon the flooring by nails 4. These nails are preferably triangular in cross-section, so they will not bend while being driven into the flooring, and have barbs 5 for reliably holding them in said flooring.

6 designates the studding, and 7 designates the combination studding and rafters forming the frame of the crib, all of which are composed, preferably, of angle-iron, so that they will be light for transportation purposes and rigid when set up to successfully withstand high winds to which the crib will be subjected at times. The lower ends of studding 6 and members 7 are turned inwardly, forming feet $7^a$, that sit squarely upon the floor, to which they are secured by lag-screws 8, entering the flooring through apertures 9 in said feet. The upper end of each rafter portion of members 7 is split into two parts, forming arms 10 and 11, respectively, the former of which extends vertically and is connected to the opposing member of like construction through the medium of interposed hollow rectangular spacing-blocks 12 and bolts 13. Arms 11 extend upwardly and outwardly a suitable distance and terminate in short vertical portions $11^a$, to the outer surfaces of which an arched ventilating-cap 14, longer than the crib, is bolted, in order to prevent rain from entering the ventilating-openings 15 between said spacing-blocks 12. Studding 6 and the studding portions of members 7 slope inwardly toward the top of the crib, and the rafter portions of said members slope upwardly toward the longitudinal central top portion of said crib for a purpose hereinafter described. Studding 6 and members 7 are covered and connected by sheet-metal sheathing consisting of strips 16, a portion of which extends from the floor to the upper ends of studding 6, while the remaining portion extends from the floor to the juncture of arms 10 and 11, as shown in Fig. 2. The longitudinal edges of strips 16 are bent inwardly at an angle of forty-five degrees (see Fig. 5) to fit the angle-irons forming studding 6 and members 7, to which they are reliably secured by bolts 17 and 18. Bolts 17, which secure strips 16 to studding 6 and the studding portions of members 7, are of ordinary construction; but the heads of bolts 18, which secure said strips to the rafter portions of members 7, are arched, as indicated at 19, to fit over the protruding portions 20, formed by punching holes 16ª in the sheathing, so that when bolts 18 are placed through said openings the arched heads 19 will overlap the protuberances 20, and thus prevent water from entering the crib through said openings.

A circulation of air upwardly through openings 15 is provided for by forming horizontal slits 21 and perforations 22 in the longitudinal walls of the crib, and in order to prevent water from entering said slits and perforations the upper edges 21ª of the former are bent outwardly, while the latter are punched from the inner side to form protuberances 22ª.

The crib is filled with grain through openings in the upper portion of one of its walls closed by small doors 23, secured to said wall by hinges 24 and provided with hasps 25, adapted to fit over staples 26 in the usual manner when it is desired to fasten the doors in a closed position. Said doors are reinforced by braces 26ª and rain is prevented from entering the crib between the upper portions of the doors and the upper portions of said openings by water-tables 27, secured to the upper edges of the latter.

Grain is removed from the crib through an opening in one of its walls normally closed by a door 28, secured to said wall by hinges 29 and provided with a hasp 30, adapted to fit over a staple 31 when it is desired to lock the door. Said door is reinforced by a brace 32, and rain is prevented from entering between its upper end and the upper portion of the opening by a water-table 33, secured to the upper edge of the latter.

By sloping studding 6 and the studding portions of members 7 inwardly toward the top of the crib the walls of the latter will be given a pyramidal form, as shown in Fig. 1. This construction causes nearly all the weight of the grain to rest upon the crib-floor, relieving the walls of excessive pressure, so they will not have a tendency to bulge outwardly, as would be the case if said walls were perpendicular or sloped outwardly at their upper portions. Consequently tie-rods and braces will not be required to reinforce said walls. In thus placing nearly all the weight upon the floor of the crib the latter will have sufficient stability to resist high winds.

By turning the apexes of the angle-irons forming members 7 inwardly gutters will be formed in the roof and walls of the crib for conducting rain from the latter to the ground.

Although we have shown the studding and rafters combined in members 7, it may be desirable at times to make these parts separate in order to facilitate shipping and handling same. We also reserve the right to make such other changes as properly fall within the scope of the invention.

From the above description it is apparent that we have produced a grain-crib which is durable, of inexpensive construction, and well adapted for the purpose intended.

Having thus described our invention, what we claim, and desire to secure by Letters Patent, is—

1. A grain-crib consisting of a floor, combination studding and rafters composed of angle-irons secured at their lower ends to the floor and suitably united at their upper terminals, the apexes of said angle-irons being turned inwardly, sheet-metal sheathing-strips having their longitudinal edges bent inwardly to form gutters and fit the angle-irons, and means for securing said longitudinal edges to the angle-irons.

2. In a grain-crib, a floor, angle-iron studding forming the ends of the crib-frame, combination studding and rafters forming the sides of the crib-frame, arms formed integral with the upper ends of the rafters, spacing-blocks connecting a number of said arms and leaving ventilating-openings in the top of the crib, and a longitudinal ventilating-cap located above said openings and secured to the remainder of the rafter-arms.

3. In a grain-crib, a member comprising a combination studding and rafter, a foot formed integral with the lower end of the studding portion of said member, a vertical arm formed integral with the upper end of the rafter portion of the member, and an irregular-shaped arm also formed integral with said rafter portion.

4. A grain-crib consisting of a floor, pyramidal-shaped walls resting upon the latter having ingress and egress openings, hinged doors for normally closing said openings reinforced with braces, water-tables secured to the upper edges of the openings, studding to which said walls are bolted, a roof inclosing the top of the crib having apertured protuberances, rafters supporting said roof having apertures registering with those in the latter, and bolts extending through said registering apertures having arched heads snugly fitting over the protuberances.

5. A grain-crib consisting of a floor, angle-iron studding forming a portion of the crib-frame, angle-iron members formed into combination studding and rafters forming the other portion of the crib-frame, feet at the lower ends of the studding portion of said members, vertical arms and irregular-shaped arms formed integral with the upper ends of the rafter portions of said members, spacing-blocks connecting the adjacent vertical arms and leaving ventilating-openings in the top of the crib, a cap arranged above said openings and secured to the irregular-shaped arms, and sheet-metal strips bent at their longitudinal edges to fit the angle-iron studding and said angle-iron members to which said strips are secured.

In testimony whereof we affix our signatures in the presence of two witnesses.

EUGENE F. POWELL.
THOMAS BUSH GRAY.

Witnesses as to the signature of Eugene F. Powell:
T. C. HOUNELL,
ESTELLA BLACK.

Witnesses as to the signature of Thomas Bush Gray:
A. G. MAGILL,
GEO. K. ALLBEE.